(12) United States Patent
Rehab et al.

(10) Patent No.: US 10,525,774 B2
(45) Date of Patent: Jan. 7, 2020

(54) TIRE WITH SPECIFIED ARRANGEMENT OF ELASTOMERIC POLYMER COMPOUND

(75) Inventors: Hichem Rehab, Clermont-Ferrand (FR); Alain Domingo, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 633 days.

(21) Appl. No.: 13/879,966

(22) PCT Filed: Oct. 20, 2011

(86) PCT No.: PCT/EP2011/068372
§ 371 (c)(1),
(2), (4) Date: May 7, 2013

(87) PCT Pub. No.: WO2012/052522
PCT Pub. Date: Apr. 26, 2012

(65) Prior Publication Data
US 2013/0220509 A1    Aug. 29, 2013

(30) Foreign Application Priority Data
Oct. 22, 2010    (FR) ...................................... 10 58636

(51) Int. Cl.
*B60C 9/18*    (2006.01)
*B60C 1/00*    (2006.01)
(Continued)

(52) U.S. Cl.
CPC ................ *B60C 9/185* (2013.01); *B60C 1/00* (2013.01); *B60C 9/18* (2013.01); *B60C 9/1835* (2013.01);
(Continued)

(58) Field of Classification Search
CPC .............. B60C 2001/0066; B60C 1/00; B60C 2001/0075; B60C 9/18; B60C 9/1835;
(Continued)

(56) References Cited

U.S. PATENT DOCUMENTS 2,598,033 A * 5/1952 Bourdon ................... 152/556 X
4,572,263 A   2/1986 Ogawa et al.
(Continued)

FOREIGN PATENT DOCUMENTS

EP    0 507 207 A2    10/1992
EP    1 028 008 A1    8/2000
(Continued)

OTHER PUBLICATIONS

International Search Report (PCT/ISA/210) dated Nov. 30, 2011, by the European Patent Office as the International Searching Authority for International Application No. PCT/EP2011/068372.

*Primary Examiner* — Adrienne C. Johnstone
(74) *Attorney, Agent, or Firm* — Dickinson Wright PLLC

(57) ABSTRACT

The invention relates to a tire with radial carcass reinforcement, made up of at least one layer of metal reinforcing elements, the said tire comprising a crown reinforcement, itself radially capped by a tread, the said tread being connected to two beads via two side walls, the said tire comprising a first layer of polymer compound radially between the carcass reinforcement and the radially innermost layer of reinforcing elements of the crown reinforcement. According to the invention, the said first layer of polymer compound constitutes a buffer zone designed to trap oxygen on the outside of the said first layer, the axial width of the said first layer being at least equal to 70% of the width of the radially innermost layer of reinforcing elements of the crown reinforcement.

6 Claims, 2 Drawing Sheets

(51) Int. Cl.
*B60C 9/20* (2006.01)
*B60C 9/22* (2006.01)

(52) U.S. Cl.
CPC .............. *B60C 9/2006* (2013.01); *B60C 9/22* (2013.01); *B60C 2001/0066* (2013.01); *B60C 2001/0075* (2013.01); *B60C 2009/1842* (2013.01); *B60C 2009/1878* (2013.01); *B60C 2009/2016* (2013.01); *B60C 2009/2022* (2013.01); *B60C 2009/2061* (2013.01); *B60C 2009/2067* (2013.01); *B60C 2009/2074* (2013.01); *B60C 2009/2077* (2013.01); *B60C 2200/06* (2013.01); *Y10T 152/1081* (2015.01); *Y10T 152/10792* (2015.01)

(58) Field of Classification Search
CPC ......... B60C 9/185; B60C 9/2006; B60C 9/22; B60C 2009/1842; B60C 2009/1878; B60C 2009/2016; B60C 2009/2022; B60C 2009/2061; B60C 2009/2067; B60C 2009/2074; B60C 2009/2077; B60C 2200/06; Y10T 152/1081; Y10T 152/10792
USPC ........................ 152/532, 537, 534

See application file for complete search history.

(56) References Cited

U.S. PATENT DOCUMENTS

| | | | |
|---|---|---|---|
| 5,738,740 A | 4/1998 | Cluzel | |
| 6,305,451 B1* | 10/2001 | Ueyoko | 152/532 X |
| 6,455,624 B1 | 9/2002 | Serre | |
| 6,675,851 B1* | 1/2004 | Masson | 152/537 X |
| 7,588,065 B2 | 9/2009 | Serre | |
| 2002/0068781 A1 | 6/2002 | Serre | |
| 2002/0156202 A1* | 10/2002 | Pagano | 152/537 X |
| 2006/0032568 A1* | 2/2006 | Lechtenboehmer | 152/537 X |
| 2006/0102269 A1 | 5/2006 | Uchida et al. | |
| 2009/0050250 A1 | 2/2009 | Kunisawa | |
| 2009/0165919 A1* | 7/2009 | Araujo Da Silva | 152/537 |
| 2009/0283194 A1* | 11/2009 | Hashimoto et al. | |
| 2009/0294012 A1 | 12/2009 | Serre | |
| 2012/0175033 A1* | 7/2012 | Lavialle et al. | |

FOREIGN PATENT DOCUMENTS

| | | |
|---|---|---|
| EP | 1 215 232 A1 | 6/2002 |
| EP | 1 659 000 A1 | 5/2006 |
| EP | 2 028 229 A2 | 2/2009 |
| FR | 1389428 A | 1/1965 |
| FR | 2222232 A1 | 10/1974 |
| FR | 2 728 510 A1 | 6/1996 |
| FR | 2 943 680 A1 | 10/2010 |
| GB | 1067856 | 5/1967 |
| GB | 1 462 656 | 1/1977 |
| JP | 7-009813 A | 1/1995 |
| WO | WO 99/24502 A1 | 5/1999 |
| WO | WO 00/68309 A1 | 11/2000 |

\* cited by examiner

TIRE WITH SPECIFIED ARRANGEMENT OF ELASTOMERIC POLYMER COMPOUND

CROSS-REFERENCE TO RELATED APPLICATIONS

This application is a 371 national phase entry of PCT/EP2011/068372, filed Oct. 20, 2011, which claims the benefit of French Patent Application No. 1058636, filed Oct. 22, 2010, the contents of which are incorporated herein by reference for all purposes.

BACKGROUND

The present invention relates to a tire with a radial carcass reinforcement and more particularly to a tire intended to be fitted to vehicles that carry heavy loads and drive at sustained speeds, such as, for example, lorries, tractors, trailers or road buses.

In general in tires of the heavy vehicle type, the carcass reinforcement is anchored on either side in the bead region and is radially surmounted by a crown reinforcement made up of at least two layers that are superposed and formed of threads or cords that are parallel within each layer and crossed from one layer to the next, making with the circumferential direction angles of between 10° and 45°. The said working layers, which form the working reinforcement, may be further covered by at least one layer termed a protective layer and formed of reinforcing elements that are advantageously metal and extensible, known as elastic elements. It may also comprise a layer of metal threads or cords with low extensibility making with the circumferential direction an angle of between 45° and 90°, this ply, known as the triangulation ply, being situated radially between the carcass reinforcement and the first so-called working crown ply, formed of threads or cords that are parallel and at angles of at most equal to 45° in terms of absolute value. The triangulation ply makes with at least the said working ply a triangulated reinforcement which, under the various stresses it may experience, undergoes very little deformation, the triangulation ply having the essential role of reacting the transverse compressive loads to which all of the reinforcing elements are subjected in the crown region of the tire.

In the case of tires for "heavy" vehicles, there is usually just one protective layer and its protective elements are, in most cases, oriented in the same direction and at the same angle in terms of absolute value as those of the reinforcing elements of the working layer that is radially outermost and therefore radially adjacent. In the case of tires for construction plant intended to run on somewhat uneven ground, the presence of two protective layers is advantageous, the reinforcing elements being crossed from one layer to the next and the reinforcing elements of the radially inner protective layer being crossed with the inextensible reinforcing elements of the working layer that is radially outer and adjacent to the said radially inner protective layer.

Cords are said to be inextensible when the said cords have, under a tensile force equal to 10% of the breaking strength, a relative elongation of 0.2% at most.

Cords are said to be elastic when the said cords have, under a tensile force equal to the breaking strength, a relative elongation of at least 3% with a maximum tangent modulus of less than 150 GPa.

The circumferential direction of the tire, or longitudinal direction, is the direction corresponding to the periphery of the tire and defined by the direction in which the tire runs.

The axis of rotation of the tire is the axis about which it revolves in normal use.

A radial or meridian plane is a plane containing the axis of rotation of the tire.

The circumferential median plane or equatorial plane is a plane perpendicular to the axis of rotation of the tire and which divides the tire into two halves.

The transverse or axial direction of the tire is parallel to the axis of rotation of the tire. An axial distance is measured in the axial direction. The expression "axially on the inside of, or axially on the outside of" respectively means "of which the axial distance, measured from the equatorial plane, is respectively less than or greater than".

The radial direction is a direction that intersects the axis of rotation of the tire and is perpendicular thereto. A radial distance is measured in the radial direction. The expression "radially on the inside of, or radially on the outside of" respectively means "of which the radial distance, measured from the axis of rotation of the tire, is respectively less than or greater than".

Some present-day tires, known as "road" tires, are intended to run at high speed over increasingly long distances, because of improvements to the road network and the expansion of the motorway network worldwide. Although all of the conditions under which such a tire is called upon to run undoubtedly allow an increase in the number of kilometers covered, because the tire wear is lower, this is at the expense of tire, and in particular crown reinforcement, durability.

This is because there are stresses in the crown reinforcement and, more particularly, shear stresses between the crown layers, which, when combined with a not-insignificant increase in operating temperatures at the ends of the axially shortest crown layer, have the effect of causing cracks to appear and spread in the rubber at the said ends. This problem exists in the case of edges of two layers of reinforcing elements, the said layers not necessarily having to be radially adjacent.

In order to improve the endurance of the crown reinforcement of the type of tire being studied, solutions relating to the structure and quality of the layers and/or profiled elements of rubber compounds which are positioned between and/or around the ends of plies and, more particularly, the ends of the axially shortest ply, have already been applied.

Patent FR 1 389 428, in order to increase the resistance to damage of the rubber compounds situated near the edges of the crown reinforcement, recommends the use, in combination with a low-hysteresis tread, of a rubber profiled element covering at least the sides and the marginal edges of the crown reinforcement and made up of a low-hysteresis rubber compound.

Patent FR 2 222 232, in order to avoid separation between crown reinforcement plies, teaches the coating of the ends of the reinforcement in a rubber mat, the Shore A hardness of which differs from that of the tread surmounting the said reinforcement, and is higher than the Shore A hardness of the profiled element of rubber compound positioned between the edges of crown reinforcing plies and carcass reinforcement.

French application FR 2 728 510 proposes positioning, on the one hand, between the carcass reinforcement and the working crown reinforcement ply radially closest to the axis of rotation, an axially continuous ply formed of inextensible metal cords making with the circumferential direction an angle of at least 60° and the axial width of which is at least equal to the axial width of the shortest working crown ply and, on the other hand, between the two working crown plies an additional ply formed of metal elements oriented substantially parallel to the circumferential direction.

French application WO 99/24269 also proposes on each side of the equatorial plane and in the immediate axial continuation of the additional ply of reinforcing elements substantially parallel to the circumferential direction, that the two working crown plies formed of reinforcing elements that are crossed from one ply to the next be coupled over a certain axial distance and then decoupled by profiled elements of rubber compound at least over the remainder of the width common to the said two working plies.

This improvement in the endurance of the tires makes it possible to consider at least the possibility of retreading when the tread has become worn. Specifically, when there is a desire to retread the tire when the tread has worn away, in order to optimize the use of the new tread the tire being retreaded has to be at not too advanced a state of ageing.

Moreover, the tires of such vehicles may suffer damage through the tread, for example if pierced by a nail or a bolt. Such piercings of the tread may not be too damaging particularly if the piercing object is removed quickly, notably by human intervention as soon as the presence of the object is detected.

However, if this presence is not detected and if the object pierces right through the crown reinforcement of the tire as far as the internal cavity of the tire, that leads to a loss of inflation air which seeps out slowly along the object.

Such a loss of inflation air, albeit slowly, leads to a drop in pressure that should alert the driver and allow the object to be detected and removed in order to repair the tire. Once again, if this detection is made sufficiently quickly, damage to the tire may be very limited, if any, without in any way jeopardizing the ability for the tire to be retreaded.

Certain vehicles these days are fitted with automatic tire reinflation devices which reinflate the tires as soon as sensors detect a drop in pressure. This reinflation operation is then usually carried out without the knowledge of the driver. If such an operation comes about in the case of a puncture as set out hereinabove, it then becomes possible that the tire will continue to be driven on with a piercing object in it for a relatively long period of time that for example allows the inflation air to reach the rubber compounds of which the tire is made up between the cavity of the tire and the exterior surface of the tire tread.

The object, which may then not be detected until the tire reaches the retreading stage, will then lead to the decision being taken not to go ahead with the said retreading, because the elements of which the tire is made up have been subjected to oxidation for an unknown period of time. Such oxidation may in fact have led to premature ageing of the tire, notably encouraging the spread of cracks within the rubber compounds, the said cracks having been initiated when the object pierced the tire.

SUMMARY

The inventors have therefore set themselves the task of providing tires that are less vulnerable to the presence of an object that has pierced the tread right through to the cavity of the tire, notably in the case of tires intended to be used on vehicles fitted with automatic tire inflation devices that reinflate in the event of a pressure loss.

This object has been achieved according to the invention using a tire with radial carcass reinforcement, made up of at least one layer of metal reinforcing elements, the said tire comprising a crown reinforcement, itself radially capped by a tread, the said tread being connected to two beads via two side walls, the said tire comprising a first layer of polymer compound radially between the carcass reinforcement and the radially innermost layer of reinforcing elements of the crown reinforcement, the said first layer of polymer compound constituting a buffer zone designed to trap oxygen on the outside of the said first layer and the axial width of the said first layer being at least equal to 70% of the width of the radially innermost layer of reinforcing elements of the crown reinforcement.

According to one preferred embodiment of the invention, the axial width of the said first layer is at most equal to the width of the radially innermost layer of reinforcing elements of the crown reinforcement.

As a further preference, the axial width of the said first layer is at least equal to 90% of the width of the radially innermost layer of reinforcing elements of the crown reinforcement.

A preferred variant of the invention is also that the thickness, measured in the radial direction, of the said first layer is greater than $\phi$, $\phi$ being the diameter of the reinforcing elements of the radially innermost layer of crown reinforcement.

As a further preference, the thickness, measured in the radial direction, of the said first layer is less than $3\phi$. As illustrated in FIG. 2, the first layer thickness is the maximum distance in the radial direction from the carcass reinforcement to the radially innermost layer of reinforcing elements of the crown reinforcement along the entire axial length of the first layer.

Such thicknesses lead to the first layer of polymer compound being dimensioned in a way that offers a compromise between the additional cost associated with the polymer compound and the spread of cracks that were initiated when the tire was pierced by the object.

Advantageously according to the invention, the thickness of the said first layer, measured in the radial direction, is greater than 1 mm and preferably greater than 1.4 mm. The inventors have been able to demonstrate that such thicknesses limit the spread of cracks in most incidents that can arise out of the tread being pierced by an object such as a nail or a bolt.

As stated previously, it is known that the presence of oxygen leads to oxidizing processes affecting rubber compositions and/or metal or textile reinforcements and/or the interfaces between these rubber compositions and these reinforcements.

It is known practice, in order to avoid the problems of oxidation, to trap the oxygen chemically using accelerated thermal oxidation of a rubber composition that acts as a buffer, positioned between a main source of oxygen and the zone that is to be protected against the phenomena of oxidation. Such a buffer composition is known for generally being used between the rubber that forms the inner liner of the tire and the carcass ply in order to reduce the amount of oxygen that comes into contact with this ply from the inflation air.

The inventors have been able to demonstrate that the presence of the said first layer of polymer compound radially between the carcass reinforcement and the radially innermost layer of reinforcing elements of the crown reinforcement with the aforementioned dimensions may be enough to limit the spread of cracks within the polymer compounds of which the tire is made up in the vast majority of cases. The inventors have notably demonstrated that the vast majority of incidents mentioned hereinabove which lead to an object that has pierced the tire becoming lodged in the tire occur in zones corresponding to the axially outermost parts of the surface of the tread. The tests carried out have shown that the said first layer of polymer compound thus described thus makes it possible to limit the spread of a great many cracks initialized when an object pierces the tire. The tests further demonstrated that it is then possible to consider retreading the tires despite the presence of an object that has pierced the tire after the tire has been repaired. This is because the tests revealed that a tire according to the invention comprising a piercing object could run at least 50% more kilometers than a conventional tire without revealing a spread of cracks prohibitive to retreading.

Further, as such polymer compounds are of not insignificant cost, a limited size of such a first layer according to the invention allows significant savings to be made in the hope of retreading for an initial on-cost that remains entirely acceptable.

In order to create such polymer compounds capable of making up the buffer zones desired to trap the oxygen, the invention according to an advantageous embodiment of the invention proposes buffer compositions containing a metal salt which catalyzes oxidation.

More advantageously, the metal salt is a cobalt salt.

This salt has the effect of activating the homolytic decomposition of the hydroperoxides generated during ageing brought about by the aforementioned oxidation phenomena. This salt is preferably added at a quantity of 0.2 to 0.3 parts by weight of cobalt equivalent per hundred parts by weight of the elastomer in the buffer composition. The amount of oxygen that can be trapped by this buffer composition is thus increased from 50 to around 100% by comparison with the same composition without the cobalt salt.

European patent document EP-A-507 207 describes, for example, polymer compounds containing a transition metal salt designed to activate the fixing of oxygen. As proposed hereinabove, the metal salts which are described by way of preference are cobalt salts. As a secondary issue, other metals such as manganese and iron are also envisaged.

International patent documents WO-A-99/24502 and WO-A-00/68309 and European patent application EP 1 215 232 describe tires comprising a buffer zone between the polymer compound that forms the cavity of the tire and the carcass reinforcement. These buffer zones are formed of polymer compounds containing at least one specific iron (III) salt designed to activate oxidation in the said composition. These products are obtained by using mechanical work to incorporate the said salt into the elastomer or elastomers that the said compounds comprise, in order to obtain the said buffer zone.

In document WO-A-99/24502, the said salt forms part of the group consisting of iron (III) acetylacetonate and the iron (III) salts of carboxylic acids satisfying the formula $Fe(C_nH_{2n}O_2)_3$, where n can range from 6 to 23.

In document WO-A-00/68309, the said salt is an iron (III) salt of a carboxylic acid satisfying the formula $Fe(C_nH_{2n}O_2)_3$ where n can range from 2 to 5.

In document EP 1 215 232, the said salt is an iron (III) salt of an aromatic monocarboxylic acid containing one or more aromatic rings.

The tires described in these three documents also allow a reduction in hysteresis losses in the buffer zone, by comparison with a buffer zone made for example using a cobalt salt. Selecting these specific iron (III) salts, also makes it possible to reduce the self-heating phenomena during running and therefore to improve the life of the tire. Furthermore, it contributes to reducing rolling resistance.

The buffer zones described in these documents correspond to polymer compounds that allow any potential migration of oxygen from the cavity to be blocked, this oxygen first of all crossing a near-airtight layer, usually made of butyl, that forms the cavity of the tire.

The inventors have also been able to demonstrate that this type of polymer compound intended to block traces of oxygen could also have the effect of blocking the presence of oxygen conveyed by seepage along the foreign body that has pierced the tire as far as the cavity thereof from the tread thereof, the said oxygen then being present at a pressure corresponding to the inflation pressure.

The inventors have even demonstrated that the increase in the elastic modulus of such a polymer compound containing a metal salt by comparison with a polymer compound not containing one is acceptable. Specifically, the presence of a layer of polymer compound between the carcass reinforcement and the crown reinforcement may have the role of acting as a shock absorber in order to preserve the integrity of the reinforcing elements of the various layers of which the tire is made up. The slight increase in elastic modulus associated with the presence of a metal salt allows the first layer to maintain this shock-absorbing role.

According to one preferred embodiment of the invention, the axial width of the said first layer of polymer compound is equal to the width of the radially innermost layer of reinforcing elements of the crown reinforcement.

According to this embodiment of the invention, it is possible to limit the spread of a greater number of cracks initiated when an object pierces the tire. Specifically, as stated earlier, the inventors have demonstrated that this type of piercing most frequently occurs at the axially outer zones of the tread. It would seem that, according to this embodiment, most of this type of incident are covered and the spread of cracks generated by these piercings can be limited.

According to this embodiment of the invention, the said first layer of polymer compound advantageously constitutes the radially inner calendering layer of the radially innermost layer of the crown reinforcement.

A layer of reinforcing elements is made up of a set of reinforcing elements contained between two layers of polymer compounds, known as calendering layers.

The thickness of the radially inner calendering layer of the radially innermost layer of the crown reinforcement is then defined so that the thickness, measured in the radial direction, from the radially innermost point of a cord to the radially inner surface of the said calendering layer corresponds to the aforementioned thickness of the said first layer. In other words, the calendering layer is designed to have a thickness greater than the thicknesses of conventional calendering layers so that its thickness, measured in the radial direction, on the back of the cords, satisfies the aforementioned relationships and notably falls between one and three times the diameter of the reinforcing elements of the radially innermost layer. A thickness of the calendering layer measured on the back of the cords which is thus advantageously of at least 1 mm is of the order of at least four times the thicknesses obtained with more conventional calendering layers.

Furthermore, this embodiment may lead to a variant in the method of manufacturing the tire when the said first layer of polymer compound corresponds to the radially inner calendering layer of the radially innermost layer of the crown reinforcement. This is because it is possible to prepare a layer of reinforcing elements comprising two calendering layers which differ in terms of their nature and in terms of their thickness. Such a layer of reinforcing element may then be the radially innermost layer of the tire. In method terms, it is then possible to dispense with the step in the manufacturing process that corresponds to laying the said first layer of polymer compound.

According to a first variant of the invention, there is a second layer of polymer compound, this being axially in contact with the first layer of polymer compound, in contact with the carcass reinforcement and extending axially at least as far as the axial end of the tread, having high cohesion and advantageously, low hysteresis. As illustrated in FIG. 2, the second layer compound also extends axially farther than an axial end of the radially innermost layer of reinforcing elements of the crown reinforcement, and extends axially not as far as the axial end of the carcass reinforcement. Such polymer compounds are, for example, described in patent application EP 1 028 008. This is a polymer compound notably containing a reinforcing filler made up:
(i) either of carbon black with a BET specific surface area of between 30 and 160 m2/g, used at contents greater than or equal to 15 phr and less than or equal to 28 phr,
(ii) or of a white filler of the silica and/or alumina type comprising SiOH and/or AlOH surface functional groups selected from the group consisting of precipitated or pyrogenated silicas, aluminas or aluminosilicates or even carbon blacks modified during or after synthesis with specific surface areas of between 30 and 260 m2/g used at contents greater than or equal to 15 phr and less than or equal to 40 phr,
(iii) or of a cut of carbon black described at (i) with a white filler described at (ii), in which cut the overall filler content is greater than or equal to 15 phr and less than or equal to 50 phr and the phr content of white filler is greater than or equal to the phr content of carbon black minus 5.

The presence of such a second layer of polymer compound further contributes to limiting the spread of cracks initiated when an object pierces the tread of the tire in an even greater number of instances.

According to a second variant of the invention, there is a second layer of polymer compound, this being axially in contact with the first layer of polymer compound, in contact with the carcass reinforcement and extending axially at least as far as the axial end of the tread, constituting another buffer zone designed to trap oxygen on the outside of the said second layer advantageously containing a metal salt which catalyzes oxidation.

According to a third variant of the invention, there is a second layer of polymer compound, this being axially in contact with the first layer of polymer compound, in contact with the carcass reinforcement and extending axially at least as far as the axial end of the tread, having high cohesion and constituting another buffer zone designed to trap oxygen on the outside of the said second layer comprising. Such a second layer of polymer compound is, for example, selected from the polymer compounds described in patent application EP 1 028 008 and advantageously contains a metal salt which catalyzes oxidation.

Another variant form of embodiment of the invention according to this same model plans for the first layer of polymer compound to constitute a buffer zone according to the invention based on a polymer compound as described in patent application EP 1 028 008.

According to one embodiment of the invention, the crown reinforcement of the tire is formed of at least two working crown layers of inextensible reinforcing elements, crossed from one layer to the other making with the circumferential direction angles of between 10° and 45°.

According to other embodiments of the invention, the crown reinforcement also comprises at least one layer of circumferential reinforcing elements.

One embodiment of the invention further plans for the crown reinforcement to be supplemented radially on the outside by at least one additional layer known as a protective layer, of reinforcing elements known as elastic elements, oriented with respect to the circumferential direction at an angle of between 10° and 45° and in the same direction as the angle formed by the inextensible elements of the working layer radially adjacent to them.

According to any one of the embodiments of the invention mentioned earlier, the crown reinforcement may be further supplemented, radially on the inside between the carcass reinforcement and the radially inner working layer nearest to the carcass reinforcement, by a triangulation layer of inextensible metal reinforcing elements made of steel making, with the circumferential direction, an angle greater than 60° and in the same direction as the angle formed by the reinforcing elements of the radially closest layer of the carcass reinforcement.

BRIEF DESCRIPTION OF THE DRAWINGS

Other advantageous details and features of the invention will become apparent hereinafter from the description of some exemplary embodiments of the invention given with reference to FIGS. 1 and 2 which depict.

DETAILED DESCRIPTION

For simplicity of understanding, the figures have not been drawn to scale.

Figure 1:
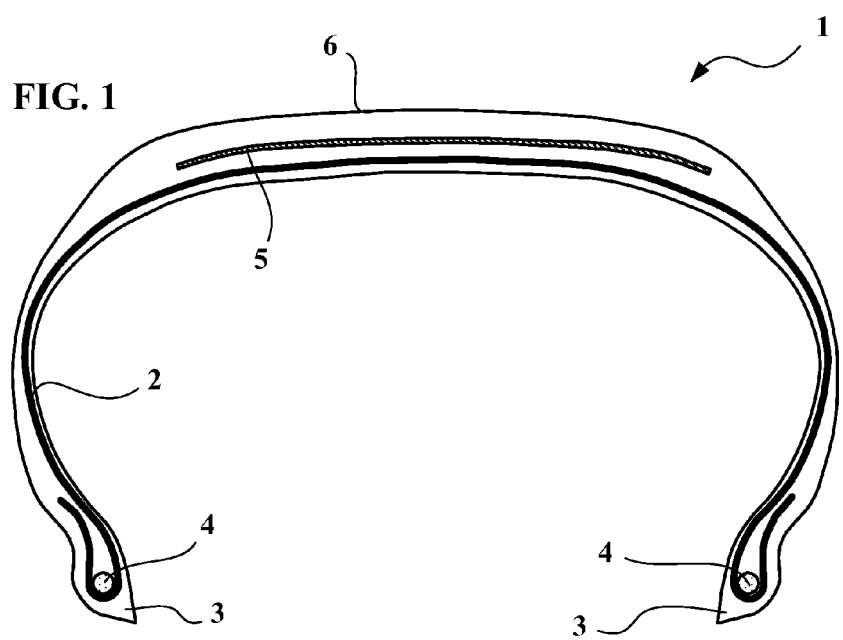
FIG. 1, a meridian view of a diagram of a tire according to the invention.

In FIG. 1, the tire 1, of size 275/80 R 22.5, comprises a radial carcass reinforcement 2 anchored in two beads 3 about bead wires 4. The carcass reinforcement 2 is formed of a single layer of metal cords. The carcass reinforcement 2 is hooped by a crown reinforcement 5, itself capped by a tread 6.

Figure 2:
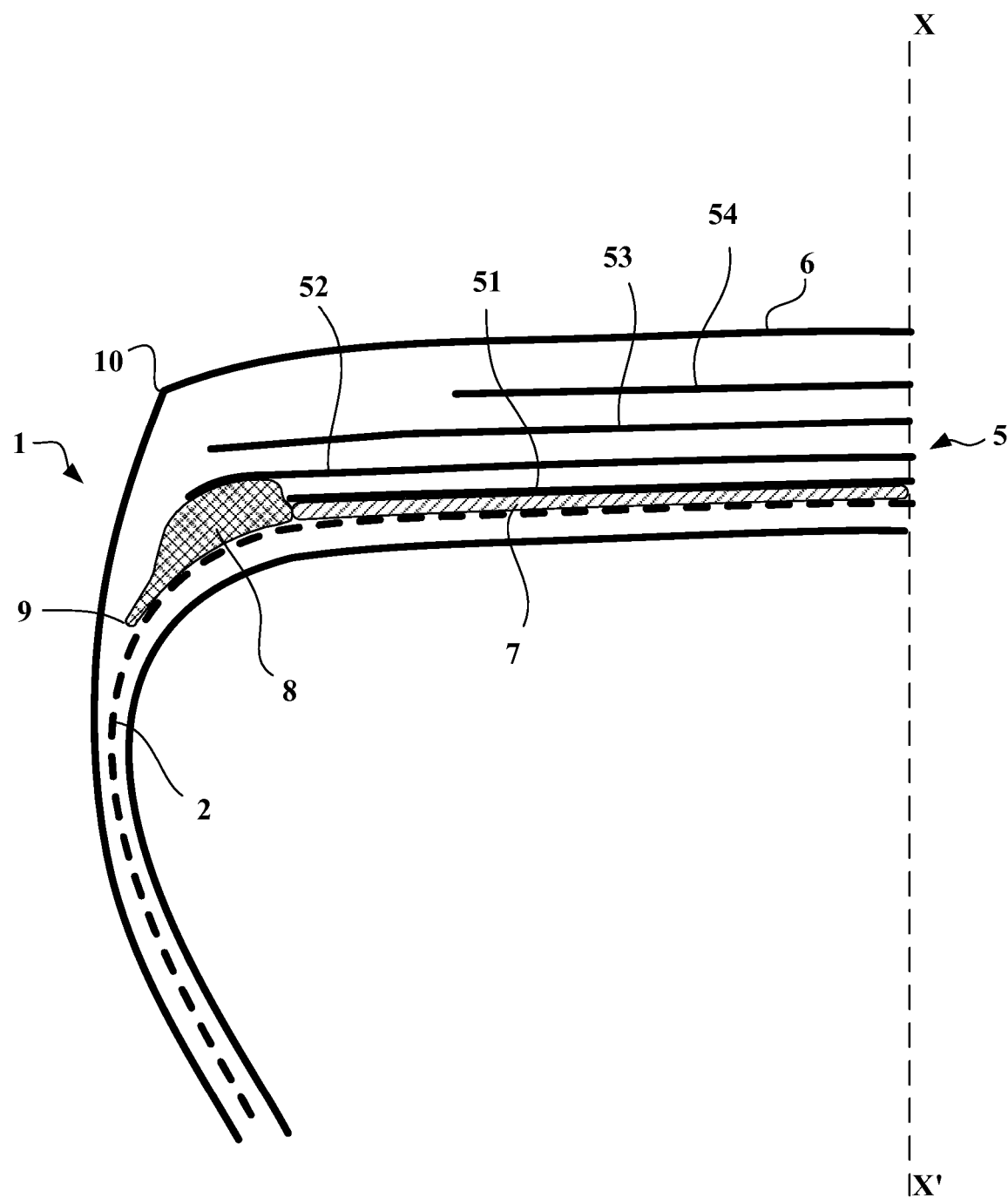
FIG. 2, a schematic depiction of a half-view of the tire of FIG. 1, which is extended symmetrically about the axis XX' that represents the circumferential median plane or equatorial plane.

The lower and bead regions of the tire 1 are notably not depicted in FIG. 2.

In FIG. 2, the crown reinforcement 5 is formed radially from the inside to the outside:
of a triangulation layer 51 formed of unwrapped inextensible 9.28 metal cords which are continuous across the entire width of the ply, oriented at an angle equal to 65°,
of a first working layer 52 formed of unwrapped inextensible 11.35 metal cords which are continuous across the entire width of the ply, oriented at an angle of 18°,
of a second working layer 53 formed of unwrapped inextensible 11.35 metal cords which are continuous across the entire width of the ply, oriented at an angle equal to 18° and crossed with the metal cords of the first working layer,
of a protective layer 54 formed of unwrapped elastic 6.35 metal cords which are continuous across the entire width of the ply, oriented at an angle equal to 18° in the same direction as the metal cords of the working layer 53.

According to the invention, radially between the carcass reinforcement 2 and the triangulation layer 51, there is the first layer of polymer compound 7 which forms a buffer zone to trap the oxygen that could notably come from the cavity of the tire 1 when an object such as a nail or bolt pierces the tread 6 and penetrates the tire as far as the cavity.

The thickness, measured in the radial direction, of the said layer of polymer compound is equal to 1.5 mm. Since the diameter of the cords of the triangulation layer 51 is equal to 1.07 mm, the thickness of the said layer of polymer compound 7 is indeed between one times and three times the diameter of these cords. As illustrated in FIG. 2, the first layer thickness is the maximum distance in the radial direction from the carcass reinforcement to the radially innermost layer of reinforcing elements of the crown reinforcement along the entire axial length of the first layer.

As explained earlier, when such an object pierces the tire and remains in place, the leakage of air is limited because the object plugs the hole that it has formed. Such a leakage may be almost imperceptible to the driver. This is especially true when the vehicle is equipped with an automatic reinflation device that reinflates the tires in order to maintain a datum pressure.

In many instances, although this small air leak is imperceptible, it leads to an air passage, or even to the formation of an air pocket within the polymer masses that make up the tire, notably encouraging the spread of cracks initiated upon piercing by the object. This phenomenon is all the more significant given that the air present is substantially at the pressure of the inflation air and therefore of the order of 8 to 9 bar in the case of a tire fitted to a vehicle of the heavy vehicle type.

In this FIG. 2, according to a variant embodiment of the invention, a second layer of polymer compound 8 is positioned in contact with the first layer of polymer compound, in contact with the carcass reinforcement and its axially outer end 9 extends axially beyond the axial end 10 of the tread 6, axially farther than an axial end of the radially innermost layer of reinforcing elements of the crown reinforcement 5, and axially not as far as the axial end of the carcass reinforcement 2. This second layer of polymer compound 8 exhibits good cohesion and has relatively low hysteresis properties. The good cohesion of this layer 8 means according to the invention that it can also contribute to reducing the rate of spread of cracks in a greater number of instances.

The second layer 8 may for example correspond to a polymer compound like the one described in patent application EP 1 028 008. The good cohesion properties of the polymer compounds are notably connected with the elongation at break of the material measured in accordance with the standard ISO37-1977.

Running tests were carried out using a tire according to the invention comprising only a first polymer layer 7, like the one depicted in FIG. 2, containing a cobalt salt. This composition is based on natural (peptized) rubber and carbon black N330 (55 phr); it also contains the following additives: sulphur (6 phr), sulphonamide accelerator (1 phr), ZnO (9 phr), stearic acid (0.7 phr), antioxidant (1.5 phr), cobalt naphthenate (1 phr).

For the sake of comparison, similar tests were carried out using a reference tire identical to the tire according to the invention, also comprising a first polymer layer but this layer not containing the cobalt salt such that it does not form a buffer zone.

Before the tests were run, the tires underwent a pretreatment which involved firstly artificially wearing down the tread as far as the tread wear indicators and secondly accelerated ageing in an oven under severe conditions both in terms of temperature and in terms of the oxygen content in the inflation air.

Moreover, the tires were punctured using a nail of 3 mm diameter from the tread as far as the cavity of the tire via the layer 7, the nail then being left in place during the tests.

The tests are carried out under load and speed conditions designed to lead to degradation of the reference tire corresponding to a tire condition that prevents the said tire from being retreaded after 15,000 kilometers covered under the said conditions of this test.

The tests carried out on the tire according to the invention under the same conditions allowed the tire to run for 25,000 kilometers, the tire still being fit for retreading having of course repaired the damage caused by the nail.

These tests demonstrate that the first layer of polymer compound makes it possible to limit the rate of spread of starter cracks created by the penetration of the nail that pierces the tire.

The invention claimed is:

1. Tire with radial carcass reinforcement made up of at least one layer of metal reinforcing elements, the said tire comprising a crown reinforcement made up of at least one layer of reinforcing elements including a radially innermost layer of reinforcing elements, the said crown reinforcement itself radially capped by a tread extending axially between a pair of axial tread ends, the said tread being connected to two beads via two side walls, the said tire comprising a first layer of elastomeric polymer compound radially between the carcass reinforcement and the radially innermost layer of reinforcing elements of the crown reinforcement, wherein the first layer of elastomeric polymer compound extends axially between a pair of first layer axial ends to define an axial width of the said first layer that is equal to the axial width of the radially innermost layer of reinforcing elements of the crown reinforcement, wherein the thickness, measured in the radial direction, of said first layer is less than $3\varphi$, $\varphi$ being the diameter of the reinforcing elements of the radially innermost layer of the crown reinforcement;

wherein the said first layer thickness is the maximum distance in the radial direction from the carcass reinforcement to the radially innermost layer of reinforcing elements of the crown reinforcement along the entire axial length of the first layer;

wherein the first layer of elastomeric polymer compound contains a cobalt salt, the cobalt salt being at a quantity of 0.2 to 0.3 parts by weight of cobalt per hundred parts by weight of the elastomer in the first layer, further comprising a second layer of the elastomeric polymer compound, the second layer being axially in contact with the pair of first layer axial ends of the first layer of the elastomeric polymer compound, wherein the second layer of the elastomeric polymer compound extends outwardly in contact with the carcass reinforcement from the pair of first layer axial ends to a pair of axially outer ends each of which extends axially farther than a respective axial end of the radially innermost layer of reinforcing elements of the crown reinforcement, extends axially at least as far as the respective axial end of the tread, and extends axially not as far as the respective axial end of the carcass reinforcement; and wherein the second layer of the elastomeric polymer compound contains a cobalt salt at a quantity of 0.2 to 0.3 parts by weight of cobalt per hundred parts by weight of the elastomer in the second layer.

2. Tire according to claim 1, wherein the thickness, measured in the radial direction, of the said first layer is greater than 1.4 mm.

3. Tire according to claim 1, wherein the said first layer of elastomeric polymer compound constitutes a radially inner calendering layer of the radially innermost layer of the crown reinforcement.

4. Tire according to claim 1, wherein the said second layer of polymer compound comprises a reinforcing filler made up:
   (i) either of carbon black with a BET specific surface area of between 30 and 160 m$^2$/g, used at contents greater than or equal to 15 phr and less than or equal to 28 phr,
   (ii) or of a white filler of the silica and/or alumina type comprising SiOH and/or AlOH surface functional groups selected from the group consisting of precipitated or pyrogenated silicas, aluminas or aluminosilicates or even carbon blacks modified during or after synthesis with specific surface areas of between 30 and 260 m$^2$/g used at contents greater than or equal to 15 phr and less than or equal to 40 phr,
   (iii) or of a cut of carbon black described at (i) with a white filler described at (ii), in which cut the overall filler content is greater than or equal to 15 phr and less than or equal to 50 phr and the phr content of white filler is greater than or equal to the phr content of carbon black minus 5.

5. Tire according to claim 1, wherein the said first layer of polymer compound contains a reinforcing filler made up:
   (i) either of carbon black with a BET specific surface area of between 30 and 160 m$^2$/g, used at contents greater than or equal to 15 phr and less than or equal to 28 phr,
   (ii) or of a white filler of the silica and/or alumina type comprising SiOH and/or AlOH surface functional groups selected from the group consisting of precipitated or pyrogenated silicas, aluminas or aluminosilicates or even carbon blacks modified during or after synthesis with specific surface areas of between 30 and 260 m$^2$/g used at contents greater than or equal to 15 phr and less than or equal to 40 phr,
   (iii) or of a cut of carbon black described at (i) with a white filler described at (ii), in which cut the overall filler content is greater than or equal to 15 phr and less than or equal to 50 phr and the phr content of white filler is greater than or equal to the phr content of carbon black minus 5.

6. Tire according to claim 1, wherein the thickness, measured in the radial direction, of said first layer is greater than $\varphi$.

* * * * *